United States Patent
Khare et al.

(10) Patent No.: US 12,489,817 B2
(45) Date of Patent: Dec. 2, 2025

(54) TERMINAL DEVICE AUTHORIZATION FOR REQUESTING ANALYTICS

(71) Applicant: Nokia Technologies Oy, Espoo (FI)

(72) Inventors: Saurabh Khare, Bangalore (IN); Chaitanya Aggarwal, Munich (DE)

(73) Assignee: NOKIA TECHNOLOGIES OY, Espoo (FI)

(*) Notice: Subject to any disclaimer, the term of this patent is extended or adjusted under 35 U.S.C. 154(b) by 272 days.

(21) Appl. No.: 18/304,543

(22) Filed: Apr. 21, 2023

(65) Prior Publication Data

US 2023/0370525 A1 Nov. 16, 2023

(30) Foreign Application Priority Data

May 13, 2022 (IN) .............................. 202241027670

(51) Int. Cl.
| | |
|---|---|
| *H04L 67/14* | (2022.01) |
| *H04L 41/16* | (2022.01) |
| *H04L 43/065* | (2022.01) |
| *H04L 67/02* | (2022.01) |
| *H04W 4/60* | (2018.01) |

(Continued)

(52) U.S. Cl.
CPC .............. *H04L 67/14* (2013.01); *H04L 41/16* (2013.01); *H04L 43/065* (2013.01); *H04L 67/02* (2013.01); *H04W 4/60* (2018.02); *H04W 8/18* (2013.01); *H04W 8/24* (2013.01)

(58) Field of Classification Search
None
See application file for complete search history.

(56) References Cited

U.S. PATENT DOCUMENTS

| 12,219,448 B2* | 2/2025 | Potluri | H04W 24/02 |
| 2020/0322821 A1* | 10/2020 | Lee | H04W 24/02 |
| 2021/0014141 A1* | 1/2021 | Patil | H04W 76/25 |

(Continued)

FOREIGN PATENT DOCUMENTS

| WO | 2020066890 A1 | 4/2020 |
| WO | 2021213035 A1 | 10/2021 |

(Continued)

OTHER PUBLICATIONS

Extended European Search Report dated Sep. 20, 2023, corresponding European Patent Application No. 23163677.0.

(Continued)

*Primary Examiner* — Lashonda Jacobs-Burton
(74) *Attorney, Agent, or Firm* — SQUIRE PATTON BOGGS (US) LLP

(57) ABSTRACT

Embodiments of the present disclosure relate to terminal device authorization for requesting analytics. A terminal device transmits a subscription for an analytics with an analytics identity to a Unified Data Management (UDM), receives a subscribed analytics identity from the UDM, according to the subscription for the analytics, transmits a request comprising the analytics identity to a Session Management Function (SMF) or an Application Function (AF), and receives analytics result data from the SMF or the AF, according to the the analytics identity after authorization of the request. The terminal device authorization for requesting analytics as provided in the present disclosure is more secure.

8 Claims, 7 Drawing Sheets

(51) Int. Cl.
*H04W 8/18* (2009.01)
*H04W 8/24* (2009.01)

(56) References Cited

U.S. PATENT DOCUMENTS

2023/0145595 A1* 5/2023 Lee .................. H04W 12/06
 370/328
2024/0275827 A1* 8/2024 Bao .................. H04W 64/003

FOREIGN PATENT DOCUMENTS

WO  WO-2023086937 A1 *  5/2023  ............. H04L 41/14
WO  WO-2023217557 A1 * 11/2023  ............. H04L 41/16

OTHER PUBLICATIONS

"3rd Generation Partnership Project; Technical Specification Group Services and System Aspects; Architecture enhancements for 5G System (5GS) to support network data analytics services (Release 17)", 3GPP Standard; 3GPP TS 23.288, 3rd Generation Partnership Project (3GPP), Mobile Competence Centre ; 650, Route Des Lucioles ; F-06921 Sophia-Antipolis Cedex ; France, No. V17.4.0 Mar. 23, 2022 (Mar. 23, 2022), pp. 1-205.

"3rd Generation Partnership Project; Technical Specification Group Services and System Aspects; Security architecture and procedures for 5G system (Release 17)", 3GPP TS 33.501, V17.5.0, Mar. 2022, pp. 1-293.

"3rd Generation Partnership Project; Technical Specification Group Services and System Aspects; Study of privacy of identifiers over radio access; (Release 18)", 3GPP TR 33.870, V0.1.0, Mar. 2022, pp. 1-10.

"3rd Generation Partnership Project; Technical Specification Group Services and System Aspects; Procedures for the 5G System (5GS): Stage 2 (Release 17)", 3GPP TS 23.502, V17.4.0, Mar. 2022, pp. 1-738.

"3rd Generation Partnership Project; Technical Specification Group Services and System Aspects; Study on enablers for network automation for the 5G System (5GS); Phase 2 (Release 17)", 3GPP TR 23.700-91, V17.0.0, Dec. 2020, pp. 1-382.

"3rd Generation Partnership Project; Technical Specification Group Core Network and Terminals; 5G System; Network Function Repository Services; Stage 3 (Release 17)", 3GPP TS 29.510, V17.5.0, Mar. 2022, pp. 1-298.

Communication under Rule 71(3) EPC dated Mar. 6, 2025 corresponding to European Patent Application No. 23163677.0.

* cited by examiner

TERMINAL DEVICE AUTHORIZATION FOR REQUESTING ANALYTICS

FIELD

Embodiments of the present disclosure generally relate to the field of telecommunication and in particular, to a method, device, apparatus and computer readable storage medium for terminal device authorization for requesting analytics.

BACKGROUND

In the communication arena, 5G communication system can support artificial intelligence (AI) or machine learning (ML) services. To avoid authorization risks in AI/ML operations, the 5G communication system needs to enable: 5G system assistance for the security management which requires data transmission support for application layer AI/ML operation over the 5G communication system, authentication and authorization involving data collection and sharing among terminal devices, Application Function (AF) and 5G core network, to take part in application layer AI/ML operations. It is also needed for the 5G communication system to enable secure AI/ML based services and operations, and to enable secure provisioning of the external parameters required for AI/ML, such as expected terminal device behaviors, and expected terminal device mobility, etc.

Recent 5G communication system can support AI/ML, but the 5G core network cannot support authorization per terminal device level. Therefore, it is needed to be solved how the 5G core network can authorize analytics requests coming from the terminal device.

SUMMARY

In general, example embodiments of the present disclosure provide a solution for terminal device authorization for requesting analytics.

In a first aspect, there is provided a device. The device comprises at least one processor; and at least one memory including computer program codes; the at least one memory and the computer program codes are configured to, with the at least one processor, cause the device to transmit, at a terminal device, a subscription for an analytics with an analytics identity to a Unified Data Management (UDM), receive a subscribed analytics identity from the UDM, according to the subscription for the analytics, transmit a request comprising the analytics identity to a Session Management Function (SMF) or an Application Function (AF), and receive analytics result data from the SMF or the AF, according to the analytics identity after authorization of the request.

In a second aspect, there is provided a device. The device comprises at least one processor; and at least one memory including computer program codes; the at least one memory and the computer program codes are configured to, with the at least one processor, cause the device to receive, at a Unified Data Management (UDM), a subscription for an analytics with an analytics identity from a terminal device, in response to receiving the subscription for the analytics, register a terminal device information in the UDM, along with Public Land Mobile Network (PLMN) information and slice information associated with the terminal device, transmit a subscribed analytics identity to the terminal device.

In a third aspect, there is provided a device. The device comprises at least one processor; and at least one memory including computer program codes; the at least one memory and the computer program codes are configured to, with the at least one processor, cause the device to receive, at a Network Repository Function (NRF) an access token request comprising a terminal device identity, a slice identity, and at least one analytics identity, from a Session Management Function (SMF) or an Application Function (AF), get, from a Unified Data Management (UDM), a terminal device information associated with the analytics identity and the terminal device identity, verify based on the got terminal device information, whether the terminal device is authorized to receive the analytics identity, in response to success of the verification with the got terminal device information, transmit an access token with the terminal device identity, the slice identity, and the analytics identity, to the SMF or the AF.

In a fourth aspect, there is provided a device. The device comprises at least one processor; and at least one memory including computer program codes; the at least one memory and the computer program codes are configured to, with the at least one processor, cause the device to receive, at a Network Data Analytics Function (NWDAF), a service request with an analytics identity from a Session Management Function (SMF) or an Application Function (AF), and transmit analytics result data to the SMF or the AF, according to the analytics identity after authorization of the service request.

In a fifth aspect, there is provided a device. The device comprises at least one processor; and at least one memory including computer program codes; the at least one memory and the computer program codes are configured to, with the at least one processor, cause the device to receive, at a Session Management Function (SMF), a request with an analytics identity from a terminal device, transmit, to a Network Data Analytics Function (NWDAF), a service request comprising the an analytics identity, receive, from the NWDAF, analytics result data, according to the service request, and transmit the analytics result data to the terminal device.

In a sixth aspect, there is provided a device. The device comprises at least one processor; and at least one memory including computer program codes; the at least one memory and the computer program codes are configured to, with the at least one processor, cause the device to receive, at an Application Function (AF), a request with an analytics identity from a terminal device, transmit, to a Network Data Analytics Function (NWDAF), a service request comprising the analytics identity, receive, from the NWDAF, analytics result data according to the service request, and transmit, to the terminal device, the analytics result data.

In a seventh aspect, there is provided a method implemented at a terminal device. The method comprises transmitting, a subscription for an analytics with an analytics identity to a Unified Data Management (UDM), receiving a subscribed analytics identity from the UDM, according to the subscription for the analytics, transmitting a request comprising the analytics identity to a Session Management Function (SMF) or an Application Function (AF), and receiving analytics result data from the SMF or the AF, according to the analytics identity after authorization of the request.

In an eighth aspect, there is provided a method implemented at a Unified Data Management (UDM). The method comprises receiving a subscription for an analytics with an analytics identity from a terminal device, in response to receiving the subscription for the analytics, registering a terminal device information in the UDM, along with Public Land Mobile Network (PLMN) information and slice information associated with the terminal device, and transmitting a subscribed analytics identity to the terminal device.

In a ninth aspect, there is provided a method implemented at a Network Repository Function (NRF).

The method comprises receiving an access token request with a terminal device identity, a slice identity, and at least one analytics identity, from a Session Management Function (SMF) or an Application Function (AF), getting, from a Unified Data Management (UDM), a terminal device information associated with the at least one analytics identity and the terminal device identity, verifying with the got terminal device information, whether the terminal device is authorized to receive the analytics identity, and in response to success of the verification with the got terminal device information, transmitting an access token with the terminal device identity, the slice identity, and the analytics identity, to the SMF or the AF.

In a tenth aspect, there is provided a method implemented at a Network Data Analytics Function (NWDAF).

The method comprises receiving a service request with an analytics identity from a Session Management Function (SMF) or an Application Function (AF), and transmitting analytics result data to the SMF or an AF, according to the analytics identity after authorization of the service request.

In an eleventh aspect, there is provided a method implemented at a Session Management Function (SMF).

The method comprises receiving a request with an analytics identity from a terminal device, transmitting, to a Network Data Analytics Function (NWDAF), a service request comprising the analytics identity, receiving, from the NWDAF, analytics result data, according to the service request, and transmitting the analytics result data to the terminal device.

In a twelfth aspect, there is provided a method implemented at an Application Function (AF).

The method comprises receiving a request with an analytics identity from a terminal device, transmitting, to a Network Data Analytics Function (NWDAF), a service request comprising the analytics identity, receiving, from the NWDAF, analytics result data according to the service request, according to the service request, and transmitting, to the terminal device, the analytics result data.

In a thirteenth aspect, there is provided an apparatus comprising means for transmitting, at a terminal device, a subscription for an analytics with an analytics identity to a Unified Data Management (UDM), means for receiving a subscribed analytics identity from the UDM, according to the subscription for the analytics, means for transmitting a request comprising the analytics identity to a Session Management Function (SMF) or an Application Function (AF), and means for receiving analytics result data from the SMF or the AF, according to the analytics identity after authorization of the request.

In a fourteenth aspect, there is provided an apparatus comprising means for receiving, at a Unified Data Management (UDM), a subscription for an analytics identity with an analytics from a terminal device, means for in response to receiving the subscription for the analytics, registering a terminal device information in the UDM, along with Public Land Mobile Network (PLMN) information and slice information associated with the terminal device, and means for transmitting a subscribed analytics identity to the terminal device.

In a fifteenth aspect, there is provided an apparatus comprising means for receiving, at a Network Repository Function (NRF), an access token request with a terminal device identity, a slice identity, and at least one analytics identity, from a Session Management Function (SMF) or an Application Function (AF), means for getting, from a Unified Data Management, a terminal device information associated with the at least one analytics identity and the terminal device identity, means for verifying with the got terminal device information, whether the terminal device is authorized to receive the analytics identity, and means for in response to success of the verification with the got terminal device information, transmitting an access token with the terminal device identity, the slice identity, and the analytics identity, to the SMF or the AF.

In a sixteenth aspect, there is provided an apparatus comprising means for receiving, at a Network Data Analytics Function (NWDAF), a service request with an analytics identity from a Session Management Function (SMF) or an Application Function (AF), and means for transmitting analytics result data to the SMF or an AF, according to the analytics identity after authorization of the service request.

In a seventeenth aspect, there is provided an apparatus comprising means for receiving, at a Session Management Function (SMF), a request with an analytics identity from a terminal device, means for transmitting, to a Network Data Analytics Function (NWDAF), a service request comprising the analytics identity, means for receiving, from the NWDAF, analytics result data, according to the service request, and means for transmitting the analytics result data to the terminal device.

In a eighteenth aspect, there is provided an apparatus comprising means for receiving, at an Application Function (AF), a request with an analytics identity from a terminal device, means for transmitting, to a Network Data Analytics Function (NWDAF), a service request comprising the analytics identity, means for receiving, from the NWDAF, analytics result data according to the service request, according to the service request, and means for transmitting, to the terminal device, the analytics result data.

In a nineteenth aspect, there is provided a non-transitory computer readable medium comprising program instructions for causing an apparatus to perform at least the method according to any one of the above seventh to twelfth aspect.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Figure 1:
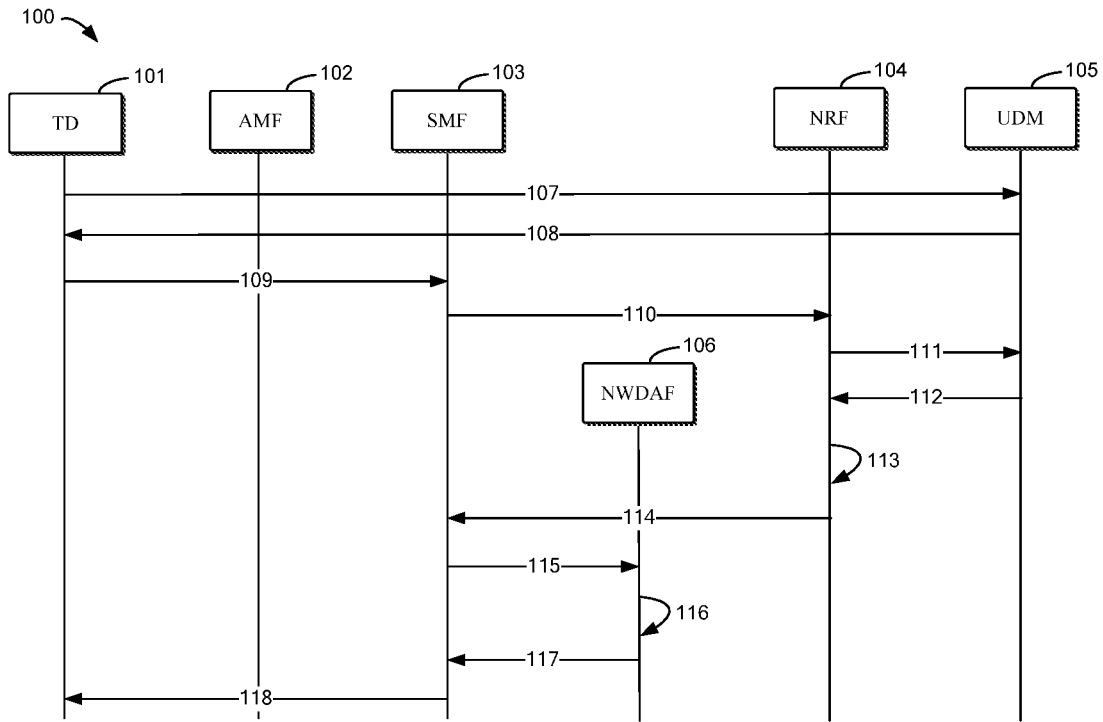
FIG. 1 illustrates a flowchart illustrating a process for terminal device authorization for requesting analytics according to some embodiments of the present disclosure.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "network function" refers to a function in 5G core network, including at least one of Unified Data Management (UDM), Network Repository Function (NRF), Network Data Analytics Function (NWDAF), Session Management Function (SMF), Access and Mobility Management Function (AMF), Application Function (AF) and Network Exposure Function (NEF). These network functions are associated with the terminal device authorization for requesting analytics for AL/ML in the example embodiments of the present disclosure. It is commonly understood by one of ordinary skills in the art that a 5G core network may comprise more functions than the UDM, NRF, NWDAF, SMF, AMF, AF and NEF, such as Policy Control Function (PCF), Network Slice Selection Function (NSSF), Authentication Server Function (AUSF), etc. The AI/ML services may be any AI/ML services that can be supported in the 5G core network, such as image recognition, auto driving, online gaming, etc.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. In the following description, the terms "terminal device", "communication device", "terminal", "user equipment" and "UE" may be used interchangeably.

As descripted in the background, recent 5G communication system can support AI/ML, but the 5G core network cannot support authorization per terminal device level. Therefore, it is needed to be solved how the 5G core network can authorize analytics requests coming from the terminal device.

According to embodiments of the present disclosure, there is providing a solution for terminal device authorization for requesting analytics with 5G core network.

Principle and embodiments of the present disclosure will be described in detail below with reference to the accompanying drawings. Reference is first made to FIG. 1, which illustrates a process 100 for terminal device authorization for requesting analytics according to some embodiments of the present disclosure. The process 100 may involve a terminal device (TD) 101, plurality of network functions, such as an AMF 102, a SMF 103, a NRF 104, a UDM 105, and a NWDAF 106.

101. The subscribed analytics identity may be transmitted via a UE Parameter Update (UPU) procedure from the UDM 105 to the TD 101. The analytics is an AI/ML logic or AI/ML service or AIML model running in the network. The analytics identity is an identity of the analytics. Terminal device uses this identity to invoke relevant applications in the network.

The TD 101 transmits 109 a request comprising the analytics identity to the SMF 103. Specifically, the TD 101 may set up a Protocol Data Unit (PDU) session with the SMF 103, then transmit the request comprising the analytics identity to the SMF 103 with the PDU session. According to example embodiments of the present disclosure, the request comprising the analytics identity from the TD 101 may be transmitted through the AMF 102 to the SMF 103, due to the 5G core network architecture.

The SMF 103 transmits 110, to the NRF 104, an access token request with the terminal device identity, a slice identity, and the analytics identity.

According to an example embodiment of the present disclosure, the Table 6.3.5.2.2-1: Definition of type AccessTokenReq in 3GPP specification TS 29.510 may be updated with the additional terminal device identity, slice identity, and analytics identity, as with the gray background in the following table. It is commonly understood by one of ordinary skills in the art that the following table shows the table update in the 3GPP specification with an example embodiment of the present disclosure, but without any limitation for the update of the table. The data type of the analytics identity, the terminal device identity (UE ID) or the slice identity (slice ID) may be other data type, the description may be illustrated in other format, the table number may be amended, etc.

TABLE 6.3.5.2.2-1

Definition of type AccessTokenReq

| Attribute name | Data type | P | Cardinality | Description |
| --- | --- | --- | --- | --- |
| grant_type | GrantType | M | 1 | This IE shall contain the grant type as "client_credentials" |
| nfInstanceId | NfInstanceId | M | 1 | This IE shall contain the NF instance id of the NF service consumer. |
| . . . | . . . | . . . | . . . | . . . |
| targetNfSetId | NfSetId | O | 0 . . . 1 | This IE may be included during an access token request for an NF type and not for a specific NF/NF service instance. When present, this IE shall contain the NF Set ID of the NF Service Producer. |
| Analytics IDs requested by UE | Array (String) | C | 1 . . . N | Indicates the target analytics requested to be used for a Subscription request by UE. |
| UE ID or Consumer UE | Array (String) | C | 1 . . . N | Indicates the ID of the UE from which the request for the analytics ID is coming. |
| Slice ID (SNSSAI) | String | C | 1 . . . N | Indicates the slice of the UE which has requested for a particular analytics ID |

According to example embodiments of the present disclosure, the TD 101 transmits 107 a subscription for an analytics with an analytics identity to the UDM 105. The subscription for the analytics with the analytics identity may be transmitted through an Application Function (AF), a Customer Relationship Management (CRM), or a portal. In response to receiving the subscription for the analytics with an analytics identity, UDM 105 registers a terminal device information in the UDM 105, along with Public Land Mobile Network (PLMN) information and slice information associated with the TD 101. After the registration, The UDM 105 transmits 108 a subscribed analytics identity to the TD According to example embodiments of the present disclosure, the SMF 103 receives the terminal device identity from the request comprising the analytics identity from the TD 101. The slice identity is for network slicing for the AI/ML services, which may be carried out in the NSSF.

The NRF 104, transmits 111 to the UDM 105, a request for the terminal device information, wherein the request comprises the analytics identity and the terminal device identity. In response to the request for the terminal device information, the UDM 105 transmits 112 the terminal device information back to the NRF 104. The terminal device information may comprise the terminal device identity, the analytics identity, at least one supported slice identity per analytics identity, and at least one supported PLMN identity per analytics identity. According to example embodiments of the present disclosure, analytics 1 such as image recognition is allowed for slice 1 and/or slice 2, and the terminal device may use analytics 1 in PLMN 1 and/or PLMN 2.

The NRF 104 verifies 113 with the got terminal device information, whether the terminal device identity is authorized to receive the analytics identity.

In response to success of the verification with the got terminal device information, the NRF 104 transmits 114 an access token with the terminal device identity, the slice identity, and the analytics identity, to the SMF 103.

According to an example embodiment of the present disclosure, the Table 6.3.5.2.4-1: Definition of type Access-TokenClaims in 3GPP specification TS 29.510 may be updated with the additional terminal device identity, slice identity, and analytics identity, as with the gray background in the following table. It is commonly understood by one of ordinary skills in the art that the following table shows the table update in the 3GPP specification with an example embodiment of the present disclosure, but without any limitation for the update of the table. The data type of the analytics identity, the terminal device identity (UE ID) or the slice identity (slice ID) may be other data type, the description may be illustrated in further format, the table number may be amended, etc.

TABLE 6.3.5.2.4-1

| Attribute name | Data type | P | Cardinality | Description |
| --- | --- | --- | --- | --- |
| Iss | NfInstanceId | M | 1 | This IE shall contain NF instance id of the NRF, corresponding to the standard "Issuer" claim described in IETF RFC 7519 [25], section 4.1.1 |
| . . . | . . . | . | . . . | . . . |
| Exp | integer | M | 1 | This IE shall contain the number of seconds after which the access token is considered to be expired, corresponding to the standard "Expiration Time" claim described in IETF RFC 7519 [25], section 4.1.4. |
| Requesting UE | Array (String) | O | 1 . . . n | Indicates the ID of the UE from which the request for the analytics ID is coming. |
| Analytics ID Requested by UE | Array (String) | O | 1 . . . n | Indicates the target analytics requested to be used for a Subscription request by UE |
| Slice ID of requesting UE | String | O | 1 . . . n | Indicates the slice of the UE which has requested for a particular analytics ID |

Definition of type AccessTokenClaims

The SMF 103 transmits 115, to the NWDAF 106, a service request comprising the analytics identity and the access token. The NWDAF 106 verifies 116 the access token with the terminal device identity and the analytics identity. The terminal device information used in the access token verification may be from the UDM 105. In response to success of the verification of the access token, the NWDAF 106 transmits 117 an analytics result data to the SMF 103. The SMF 103 transmits 118 the analytics result data to the TD 101. The analytics result data may be transmitted from the SMF 103 to the TD 101 via the AMF 102, due to the architecture of the 5G core network.

According to example embodiments of the present disclosure, in the process 100, the authorization is implemented in the NRF 104 based on a terminal device information and associated information.

According to example embodiments of the present disclosure, an analytics is an artificial intelligence (AI)/machine learning (ML) logic or AI/ML service or AI/ML model running in a 5G core network. The analytics identity is an identity for an analytics, to invoke a relevant application in the 5G core network.

Figure 2:
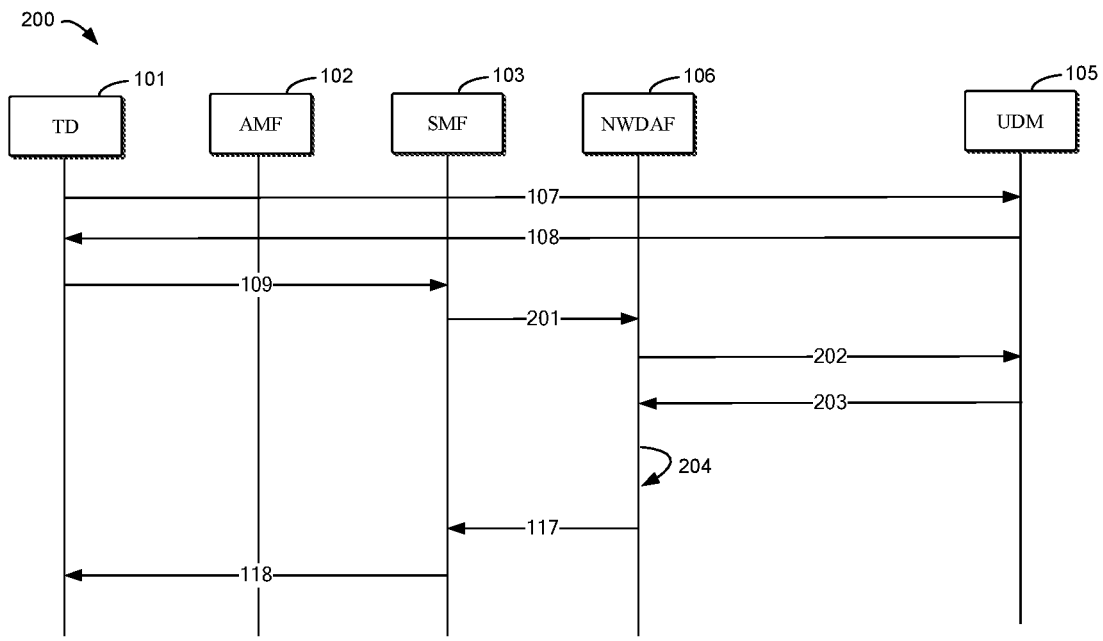
FIG. 2 illustrates a flowchart illustrating a process for terminal device authorization for requesting analytics according to some embodiments of the present disclosure.

According to example embodiments of the present disclosure, the process for terminal device authorization for requesting analytics may be implemented without the NRF 104, and without the access token, as illustrated in FIG. 2. Without access token, the implementation of the process may be simplified.

In the process 200 in FIG. 2, the TD 101 and the network functions AMF 102, SMF 103, NWDAF 106, UDM 105 are the same with those in FIG. 1, and the steps 107, 108, 109, 117, 118 may be the same with those in FIG. 1 as well.

Without the NRF 104, SMF 103 transmits 201 to the NWDAF 106, a service request with an analytics identity. The NWDAF 106 transmits 202 a request for a terminal device information associated with the analytics identity and the terminal device identity to the UDM 105, then receives 203 the terminal device information from the UDM 105, wherein the terminal device information comprises the analytics identity, the terminal device identity, at least one supported slice identity per analytics identity, and at least one supported PLMN identity per analytics identity. The NWDAF 106 verifies 204 the authorization of the analytics identity and the terminal device identity based on the received terminal device information from UDM 105. In response to the success of verifying the authorization, the NWDAF 106 transmits 117 the analytics result data to the SMF 103.

According to example embodiments of the present disclosure, in the process 200, the authorization is implemented in the UDM 105 based on a terminal device information and associated information.

Figure 3:
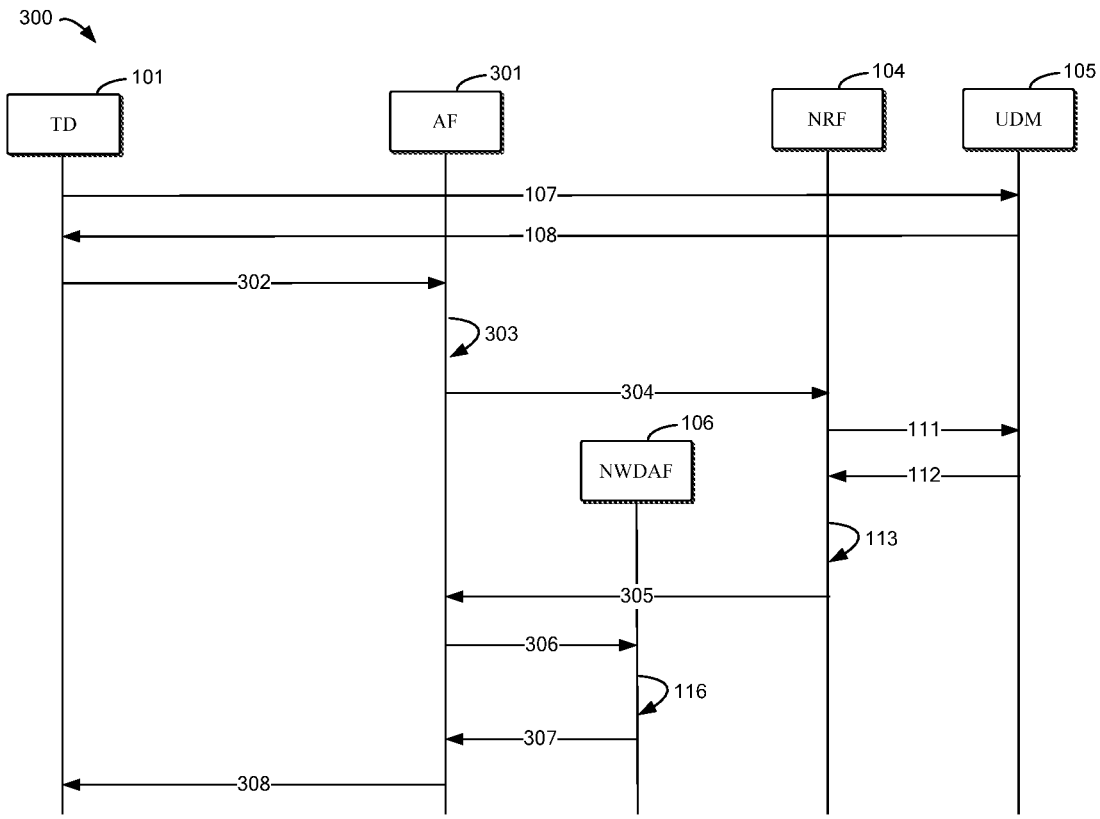
FIG. 3 illustrates a flowchart illustrating a process for terminal device authorization for requesting analytics according to some embodiments of the present disclosure.

According to example embodiments of the present disclosure, the process for terminal device authorization for requesting analytics may be implemented without the AF, or the SMF, but with an AF, as illustrated in FIG. 3.

As illustrated in the process 300 in FIG. 3, compared with FIG. 1, the AMF 102 and the SMF 103 are removed, while an AF 301 is added. In the process 300 in FIG. 3, the steps 107, 108, 111, 112, 113, and 116 may be the same with those in FIG. 1.

TD 101 transmits 302 a request comprising the analytics identity to an AF 301. In 303, the AF 301 converts a terminal device IP address to a Subscription Permanent Identifier (SUPI), and uses the SUPI as the terminal device identity. The AF 301 transmits 304, to the NRF 104, an access token request comprising the terminal device identity, a slice identity, and an analytics identity. The NRF 104 verifies 113 based on the got terminal device information, whether the terminal device identity is authorized to receive the analytics identity. In response to success of the verification with the got terminal device information, the NRF 104 transmits 305 an access token with the terminal device identity, the slice identity, and the analytics identity, to the AF 301.

The AF 301 transmits 306, to the NWDAF 106, a service request with the analytics identity and the access token received from the NRF 104. In case of successful verification of the access token by the NWDAF 106, the analytics result data is sent by the NWDAF 106. The AF 301 then receives 307 an analytics result data according to the service request. Finally, the AF 301 transmits 308 the analytics result data to the terminal device.

According to example embodiments of the present disclosure, in the process 300, the authorization is implemented in the NRF 104 based on a terminal device information and associated information.

Figure 4:
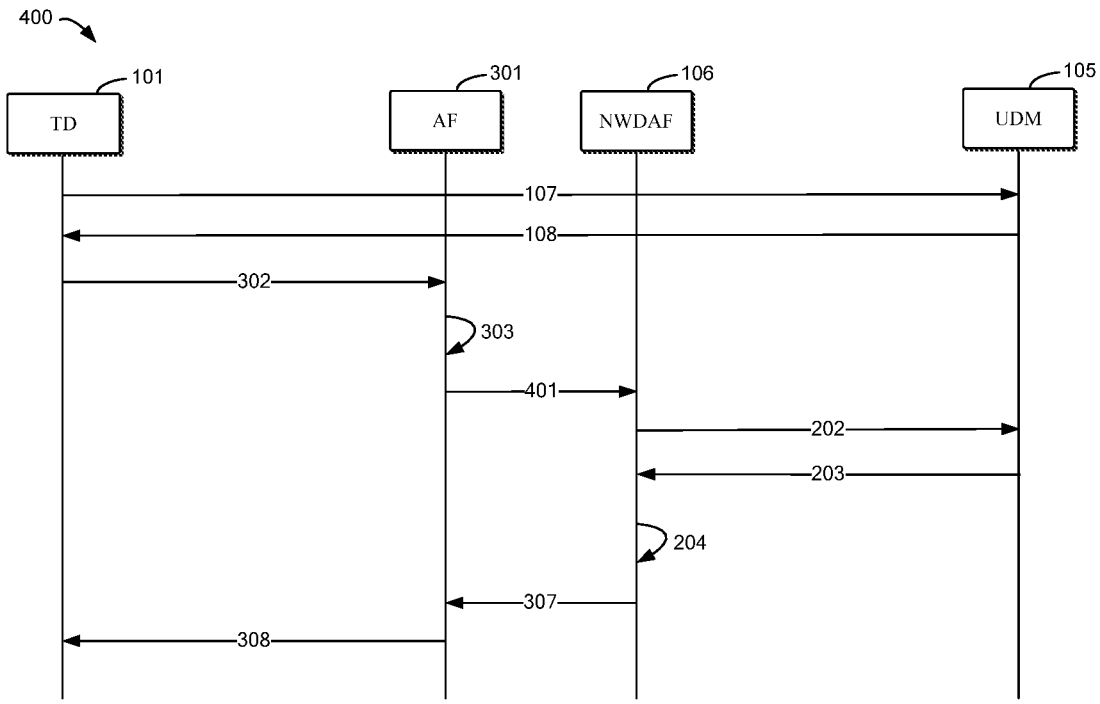
FIG. 4 illustrates a flowchart illustrating a process for terminal device authorization for requesting analytics according to some embodiments of the present disclosure.

According to example embodiments of the present disclosure, NRF 104 may also be removed from process 300, as well as the access token, for the simplicity of implementation, as in FIG. 4.

As illustrated in FIG. 4, process 400 comprises TD 101, AF 301, NWDAF 106, UDM 105, as the same with those in FIG. 3. The steps 107, 108, 302, 303, 307, and 308 may be the same with those in FIG. 3. The steps 202, 203, and 204 may be the same with those in FIG. 2.

According to example embodiments of the present disclosure, the AF 301 transmits 401, to the NWDAF 106, a service request with an analytics identity. The NWDAF 106 transmits 202 a request for a terminal device information associated with the analytics identity and the terminal device identity to the UDM 105, then receives 203 the terminal device information from the UDM 105, wherein the terminal device information comprises the analytics identity, the terminal device identity, at least one supported slice identity per analytics identity, and at least one supported PLMN identity per analytics identity. The NWDAF 106 verifies 204 the authorization of the analytics identity and the terminal device identity based on the received terminal device information from UDM 105. In response to the success of verifying the authorization, the NWDAF 106 transmits 307 the analytics result data to the AF 301. Finally, the AF 301 transmits the analytics result data to the TD 101.

According to example embodiments of the present disclosure, in the process 400, the authorization is implemented in the UDM 105 based on a terminal device information and associated information.

Figure 5:
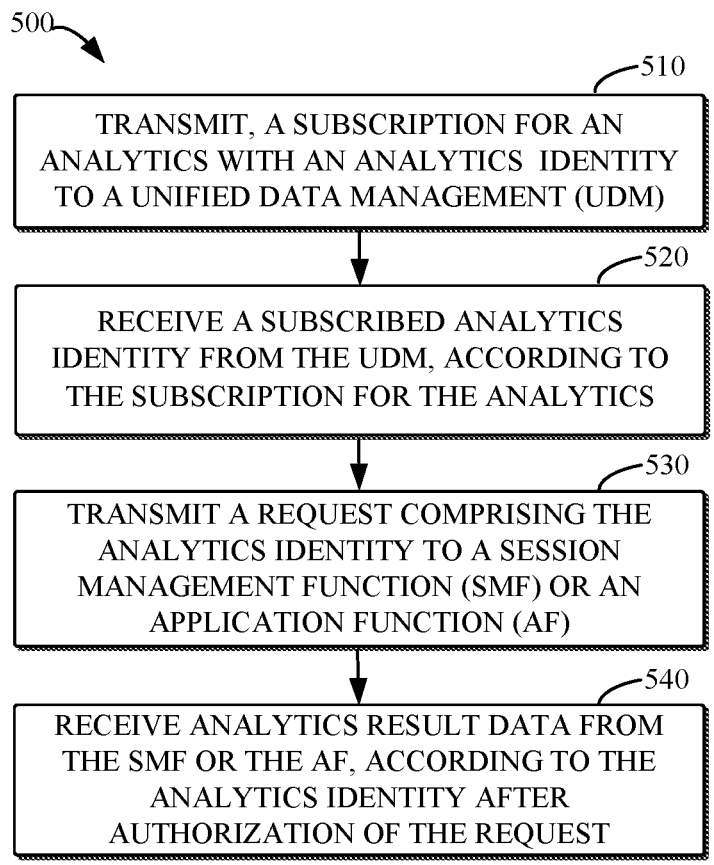
FIG. 5 illustrates a flowchart of a method implemented at a terminal device according to some embodiments of the present disclosure.

FIG. 5 illustrates a flowchart of a method implemented at a terminal device according to some embodiments of the present disclosure. For the purpose of discussion, the method 500 will be described from the perspective of the terminal device 101 with reference to FIG. 1, FIG. 2, FIG. 3, and FIG. 4.

At block 510, the terminal device 101 transmits, a subscription for an analytics with an analytics identity to a Unified Data Management (UDM). At block 520, the terminal device 101 receives a subscribed analytics identity from the UDM, according to the subscription for the analytics. At block 530, the terminal device 101 transmits a request comprising the analytics identity to a Session Management Function (SMF) or an Application Function (AF). At block 540, the terminal device 101 receives analytics result data from the SMF or the AF, according to the analytics identity after authorization of the request.

In some embodiments, the terminal device is caused to transmit the subscription with the analytics identity by: transmitting the subscription with the analytics identity to the UDM through the AF, a Customer Relationship Management (CRM), or a portal, and/or the terminal device is caused to receive the subscribed analytics identity by: receiving the subscribed analytics identity from the UDM through a UE Parameter Update (UPU) procedure.

In some embodiments, the terminal device is caused to transmit the request by: setting up a Protocol Data Unit (PDU) session with the SMF, transmitting the request comprising the analytics identity to the SMF with the PDU session through an Access and Mobility Management Function (AMF), or transmitting a Hyper Text Transfer Protocol (HTTP) request comprising the analytics identity to the AF.

In some embodiments, the authorization is implemented in the UDM or in a Network Repository Function based on terminal device information and associated information.

Figure 6:
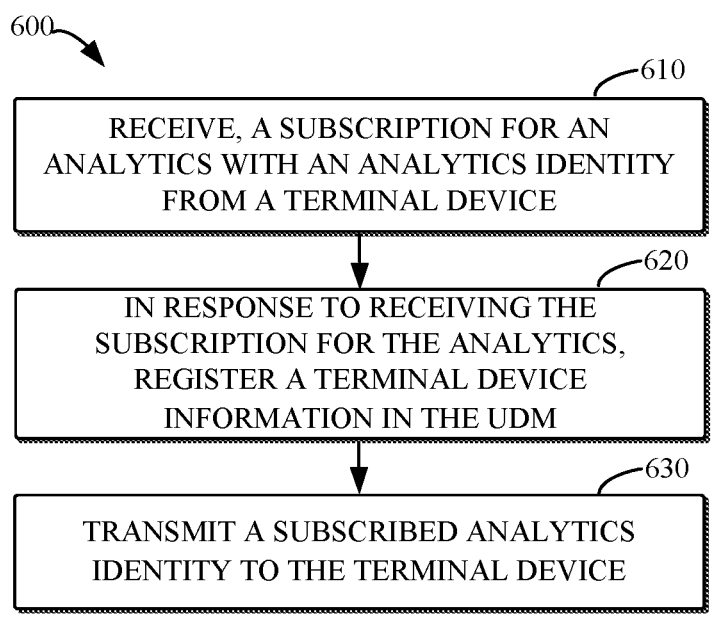
FIG. 6 illustrates a flowchart of a method implemented at a Unified Data Management according to some embodiments of the present disclosure.

In some embodiments, the analytics is an artificial intelligence (AI)/machine learning (ML) logic or AI/ML service or AI/ML model running in a 5G core network; the analytics identity is an identity of the analytics, to invoke a relevant application in the 5G core network, FIG. 6 illustrates a flowchart of a method implemented at a Unified Data Management (UDM) according to some embodiments of the present disclosure. For the purpose of discussion, the method 600 will be described from the perspective of the UDM 105 with reference to FIG. 1, FIG. 2, FIG. 3, and FIG. 4.

At block 610, the UDM 105 receives, a subscription for an analytics with an analytics identity from a terminal device. At block 620, in response to receiving the subscription for the analytics, the UDM 105 registers a terminal device information in the UDM, along with Public Land Mobile Network (PLMN) information and slice information associated with the terminal device. At block 630, the UDM 105 transmits a subscribed analytics identity to the terminal device.

In some embodiments, the terminal device information comprises at least one of: a terminal device identity, the analytics identity, at least one supported slice identity per analytics identity, and at least one supported PLMN identity per analytics identity.

In some embodiments, the UDM 105 is further caused to: receive a request for a terminal device information associated with the analytics identity and the terminal device identity from a Network Repository Function (NRF), or from a Network Data Analytics Function (NWDAF), in response to receiving the request for the terminal device information, transmit the terminal device information to the NRF, or the NWDAF.

Figure 7:
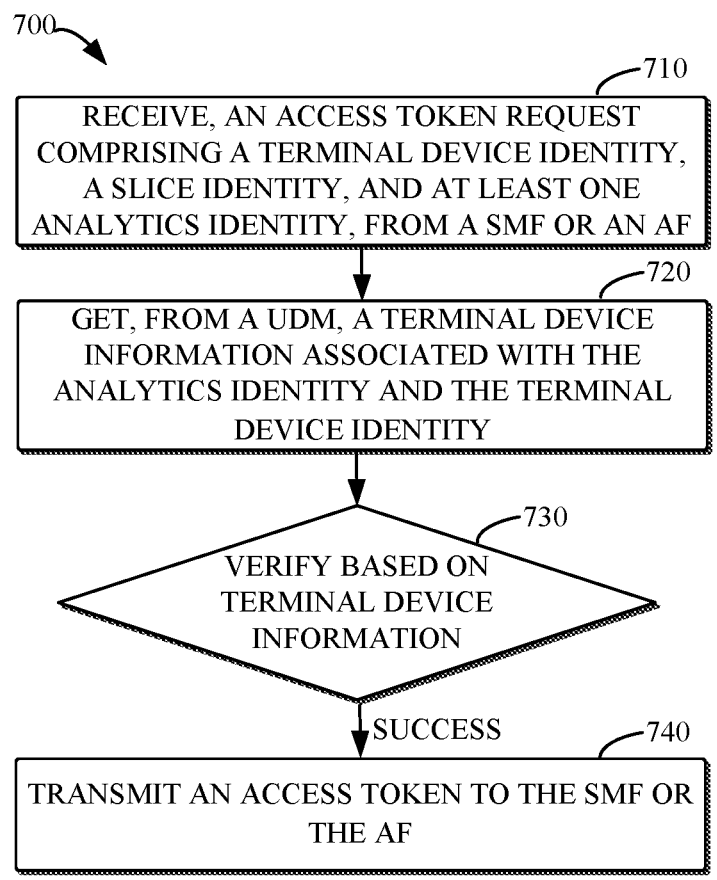
FIG. 7 illustrates a flowchart of a method implemented at a Network Repository Function according to some embodiments of the present disclosure.

FIG. 7 illustrates a flowchart of a method implemented at a Network Repository Function (NRF) according to some embodiments of the present disclosure. For the purpose of discussion, the method 700 will be described from the perspective of the NRF 104 with reference to FIG. 1, and FIG. 3.

At block 710, the NRF 104 receives, an access token request comprising a terminal device identity, a slice identity, and at least one analytics identity, from a Session Management Function (SMF) or an Application Function (AF). At block 720, the NRF 104 gets, from a Unified Data Management (UDM), a terminal device information associated with the analytics identity and the terminal device identity. At block 730, the NRF 104 verifies based on the got terminal device information, whether the terminal device is authorized to receive the analytics identity. At block 740, in response to success of the verification with the got terminal device information, the NRF 104 transmits an access token with the terminal device identity, the slice identity, and the analytics identity, to the SMF or the AF.

In some embodiments, the NRF 104 is caused to get the terminal device information by: transmitting, to the UDM, a request for the terminal device information, wherein the request comprised an analytics identity and a terminal device identity, receiving, from the UDM, the terminal device information, wherein the terminal device information comprises the terminal device identity, the analytics identity, at least one supported slice identity per analytics identity, and at least one supported Public Land Mobile Network (PLMN) identity per analytics identity.

Figure 8:
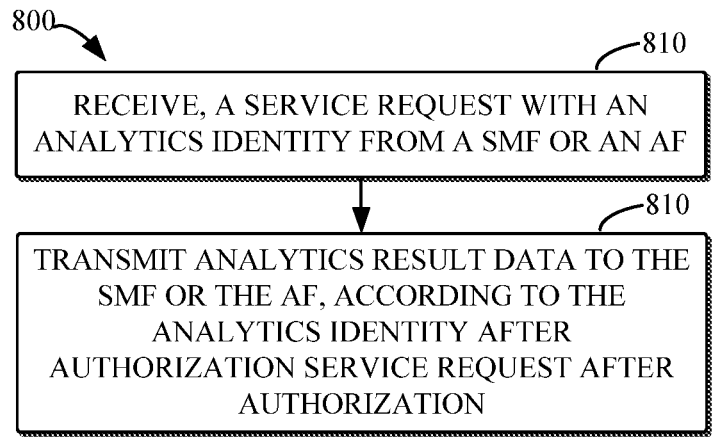
FIG. 8 illustrates a flowchart of a method implemented at a Network Data Analytics Function according to some embodiments of the present disclosure.

FIG. 8 illustrates a flowchart of a method implemented at a Network Data Analytics Function (NWDAF) according to some embodiments of the present disclosure. For the purpose of discussion, the method 800 will be described from the perspective of the NWDAF 106 with reference to FIG. 1, FIG. 2, FIG. 3, and FIG. 4.

At block 810, the NWDAF 106 receives, a service request with an analytics identity from a Session Management Function (SMF) or an Application Function (AF). At block 820, the NWDAF 106 transmits analytics result data to the SMF or the AF, according to the analytics identity after authorization of the service request.

In some embodiments, before transmitting the analytics result data, the NWDAF 106 is further caused to: verifying an access token with a terminal device identity and the analytics identity, in response to the success of verifying the access token, transmitting the analytics result data to the SMF, wherein the service request comprises the access token.

In some embodiments, before transmitting the analytics result data, the NWDAF 106 is further caused to: transmitting a request for a terminal device information associated with an analytics identity and a terminal device identity to a Unified Data Management (UDM), receiving the terminal device information from the UDM, wherein the terminal device information comprises an analytics identity, a terminal device identity, at least one supported slice identity per analytics identity, and at least one supported Public Land Mobile Network (PLMN) identity per analytics identity, verifying the authorization of the analytics identity and the terminal device identity, in response to the success of verifying the authorization, transmitting the analytics result data to the SMF or the AF.

Figure 9:
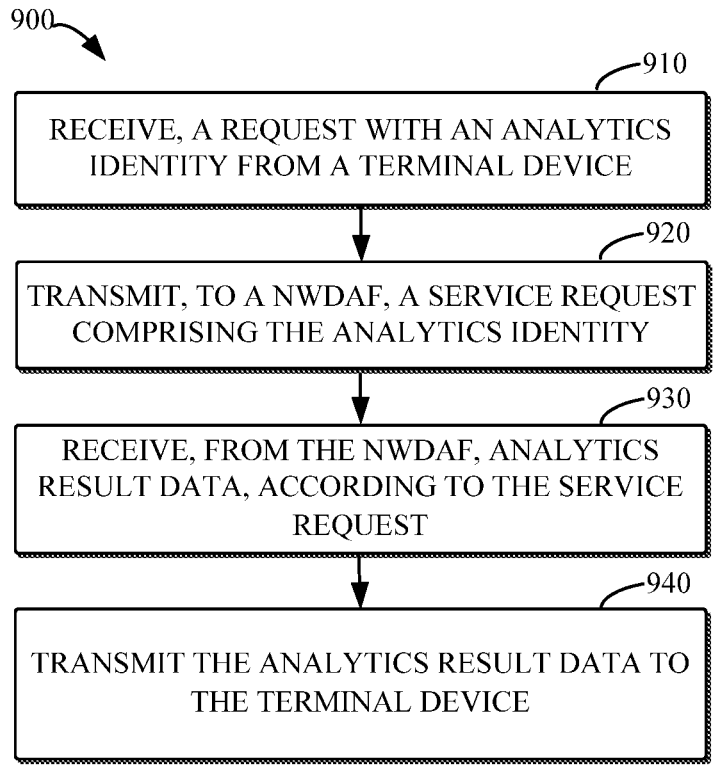
FIG. 9 illustrates a flowchart of a method implemented at a Session Management Function according to some embodiments of the present disclosure.

FIG. 9 illustrates a flowchart of a method implemented at a Session Management Function (SMF) according to some embodiments of the present disclosure. For the purpose of discussion, the method 900 will be described from the perspective of the SMF 103 with reference to FIG. 1 and FIG. 2.

At block 910, the SMF 103 receives a request with an analytics identity from a terminal device. At block 920, the SMF 103 transmits, to a Network Data Analytics Function (NWDAF), a service request comprising the analytics identity. At block 930, the SMF 103 receives, from the NWDAF, analytics result data, according to the service request. At block 940, the SMF 103 transmits the analytics result data to the terminal device.

In some embodiments, before transmitting the service request to the NWDAF, the SMF 103 is further caused to: transmitting, to a Network Repository Function (NRF), an access token request with a terminal device identity, a slice identity, and the analytics identity, receiving from the Network Repository Function, an access token with the terminal device identity, the slice identity, and the analytics identity, according to the access token request. The SMF 103 then adds the received access token into the service request to be transmitted to the NWDAF.

Figure 10:
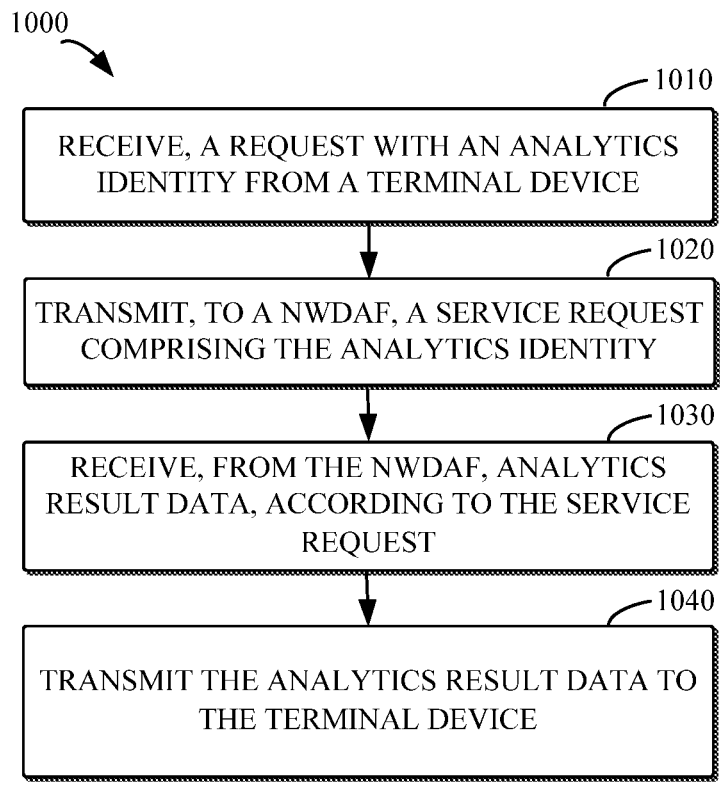
FIG. 10 illustrates a flowchart of a method implemented at an Application Function according to some embodiments of the present disclosure.

FIG. 10 illustrates a flowchart of a method implemented at an Application Function (AF) according to some embodiments of the present disclosure. For the purpose of discussion, the method 1000 will be described from the perspective of the AF 301 with reference to FIG. 3, and FIG. 4.

At block 1010, the AF 301 receives, a request with an analytics identity from a terminal device. At block 1020, the AF 301 transmits, to a Network Data Analytics Function (NWDAF), a service request comprising the analytics identity. At block 1030, the AF 301 receives, from the NWDAF, analytics result data according to the service request. At block 1040, the AF 301 transmits, to the terminal device, the analytics result data.

In some embodiments, before transmitting the service request, the AF 301 is further caused to: transmitting, to a Network Repository Function (NRF), an access token request with a terminal device identity, a slice identity, and the analytics identity, receiving, from the NRF, the access token with the terminal device identity, the slice identity, and the analytics identity, according to the access token request. The AF 301 adds the received access token into the service request to be transmitted to the NWDAF.

In some embodiments, the AF 301 is a trusted AF, or the AF is a Network Exposure Function (NEF).

In some embodiments, an apparatus capable of performing any of the method 500 (for example, the terminal device 101) may comprise means for performing the respective steps of the method 500. The means may be implemented in any suitable form. For example, the means may be implemented in a circuitry or software module.

In some embodiments, the apparatus comprises means for transmitting a subscription for an analytics with an analytics identity to a Unified Data Management (UDM), means for receiving a subscribed analytics identity from the UDM, according to the subscription for the analytics, means for transmitting a request comprising the analytics identity to a Session Management Function (SMF) or an Application Function (AF), and means for receiving analytics result data from the SMF or the AF, according to the analytics identity after authorization of the request.

In some embodiments, the apparatus further comprises means for performing other steps in some embodiments of the method 500. In some embodiments, the means comprises at least one processor; and at least one memory including computer program code, the at least one memory and computer program code configured to, with the at least one processor, cause the performance of the apparatus.

In some embodiments, an apparatus capable of performing any of the method 600 (for example, the UDM 105) may comprise means for performing the respective steps of the method 600. The means may be implemented in any suitable form. For example, the means may be implemented in a circuitry or software module.

In some embodiments, the apparatus comprises means for receiving, a subscription for an analytics with an analytics identity from a terminal device, means for in response to receiving the subscription for the analytics, registering a terminal device information in the UDM, along with Public Land Mobile Network (PLMN) information and slice information associated with the terminal device, means for transmitting a subscribed analytics identity to the terminal device.

In some embodiments, the apparatus further comprises means for performing other steps in some embodiments of the method 600. In some embodiments, the means comprises at least one processor; and at least one memory including computer program code, the at least one memory and computer program code configured to, with the at least one processor, cause the performance of the apparatus.

In some embodiments, an apparatus capable of performing any of the method 700 (for example, the NRF 104) may comprise means for performing the respective steps of the method 700. The means may be implemented in any suitable form. For example, the means may be implemented in a circuitry or software module.

In some embodiments, the apparatus comprises means for means for receiving, an access token request comprising a terminal device identity, a slice identity, and at least one analytics identity, from a Session Management Function (SMF) or an Application Function (AF), means for getting, from a Unified Data Management, a terminal device information associated with the analytics identity and the terminal device identity, means for verifying based on the got terminal device information, whether the terminal device is authorized to receive the analytics identity, means for in response to success of the verification with the got terminal device information, transmitting an access token with the terminal device identity, the slice identity, and the analytics identity, to the SMF or the AF.

In some embodiments, the apparatus further comprises means for performing other steps in some embodiments of the method 700. In some embodiments, the means comprises at least one processor; and at least one memory including computer program code, the at least one memory and computer program code configured to, with the at least one processor, cause the performance of the apparatus.

In some embodiments, an apparatus capable of performing any of the method 800 (for example, the NWDAF 106) may comprise means for performing the respective steps of the method 800. The means may be implemented in any suitable form. For example, the means may be implemented in a circuitry or software module.

In some embodiments, the apparatus comprises means for receiving a service request with an analytics identity from a Session Management Function (SMF) or an Application Function (AF), means for transmitting analytics result data to the SMF or an AF, according to the analytics identity after authorization of the service request.

In some embodiments, the apparatus further comprises means for performing other steps in some embodiments of the method 800. In some embodiments, the means comprises at least one processor; and at least one memory including computer program code, the at least one memory and computer program code configured to, with the at least one processor, cause the performance of the apparatus.

In some embodiments, an apparatus capable of performing any of the method 900 (for example, the SMF 103) may comprise means for performing the respective steps of the method 900. The means may be implemented in any suitable form. For example, the means may be implemented in a circuitry or software module.

In some embodiments, the apparatus comprises means for receiving a request with an analytics identity from a terminal device, means for transmitting, to a Network Data Analytics Function (NWDAF), a service request comprising the analytics identity, means for receiving, from the NWDAF, analytics result data, according to the service request, means for transmitting the analytics result data to the terminal device.

In some embodiments, the apparatus further comprises means for performing other steps in some embodiments of the method 900. In some embodiments, the means comprises at least one processor; and at least one memory including computer program code, the at least one memory and computer program code configured to, with the at least one processor, cause the performance of the apparatus.

In some embodiments, an apparatus capable of performing any of the method 1000 (for example, the AF 301) may comprise means for performing the respective steps of the method 1000. The means may be implemented in any suitable form. For example, the means may be implemented in a circuitry or software module.

In some embodiments, the apparatus comprises means for receiving a request with an analytics identity from a terminal device, means for transmitting, to a Network Data Analytics Function (NWDAF), a service request comprising the analytics identity, means for receiving, from the NWDAF, analytics result data according to the service request, according to the service request, means for transmitting, to the terminal device, the analytics result data.

In some embodiments, the apparatus further comprises means for performing other steps in some embodiments of the method 1000. In some embodiments, the means comprises at least one processor; and at least one memory including computer program code, the at least one memory and computer program code configured to, with the at least one processor, cause the performance of the apparatus.

Figure 11:
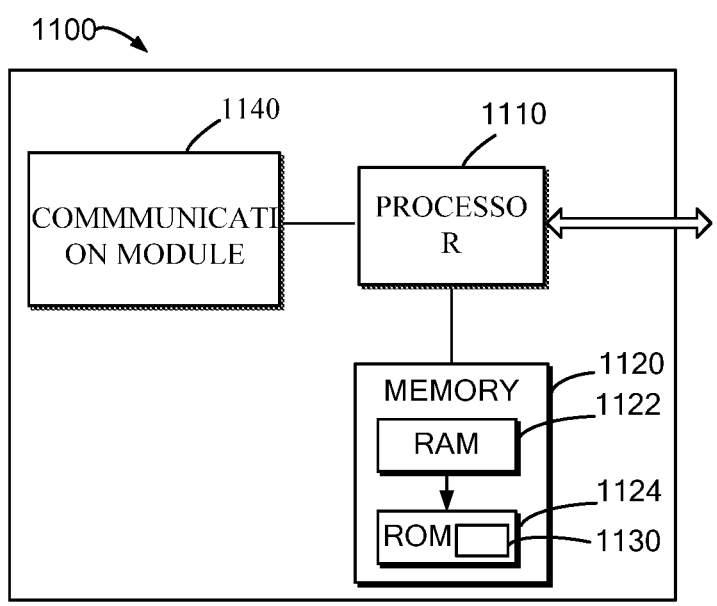
FIG. 11 illustrates a simplified block diagram of an apparatus that is suitable for implementing embodiments of the present disclosure.

FIG. 11 is a simplified block diagram of a device 1100 that is suitable for implementing embodiments of the present disclosure. The device 1100 may be provided to implement the terminal device or the network functions, for example the TD 101, the AMF 102, the SMF 103, the NRF 104, the UDM 105, the NWDAF 106, and the AF 301 as shown in FIG. 1, FIG. 2, FIG. 3, and FIG. 4. As shown, the device 1100 includes one or more processors 1110, one or more memories 1120 coupled to the processor 1110, and one or more transmitters and/or receivers (TX/RX) 1140 coupled to the processor 1110.

The TX/RX 1140 is for bidirectional communications. The communication interface may represent any interface that is necessary for communication with other network functions.

The processor 1110 may be of any type suitable to the local technical network and may include one or more of the following: general purpose computers, special purpose computers, microprocessors, digital signal processors (DSPs) and processors based on multicore processor architecture, as non-limiting examples. The device 1100 may have multiple processors, such as an application specific integrated circuit chip that is slaved in time to a clock which synchronizes the main processor.

The memory 1120 may include one or more non-volatile memories and one or more volatile memories. Examples of the non-volatile memories include, but are not limited to, a Read Only Memory (ROM) 1124, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 1122 and other volatile memories that will not last in the power-down duration.

A computer program 1130 includes computer executable instructions that are executed by the associated processor

1110. The program 1130 may be stored in the ROM 1124. The processor 1110 may perform any suitable actions and processing by loading the program 1130 into the RAM 1120.

The embodiments of the present disclosure may be implemented by means of the program 1130 so that the device 1100 may perform any process of the disclosure as discussed with reference to FIGS. 1 to 10. The embodiments of the present disclosure may also be implemented by hardware or by a combination of software and hardware.

Figure 12:
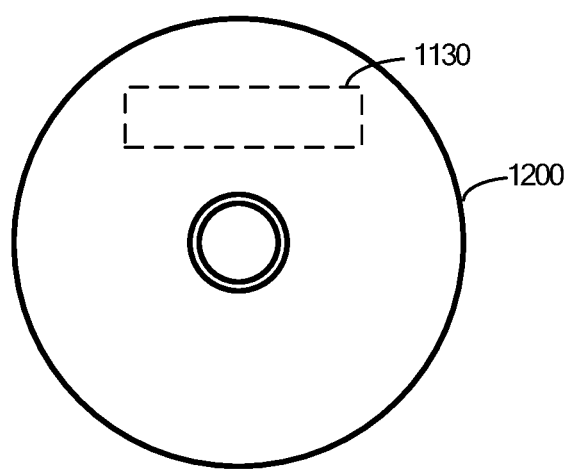
FIG. 12 illustrates a block diagram of an example computer readable medium in accordance with some embodiments of the present disclosure.

In some embodiments, the program 1130 may be tangibly contained in a computer readable medium which may be included in the device 1100 (such as in the memory 1120) or other storage devices that are accessible by the device 1100. The device 1100 may load the program 1130 from the computer readable medium to the RAM 1122 for execution. The computer readable medium may include any types of tangible non-volatile storage, such as ROM, EPROM, a flash memory, a hard disk, CD, DVD, and the like. FIG. 12 shows an example of the computer readable medium 1200 in form of CD or DVD. The computer readable medium has the program 1130 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the method 1100 as described above with reference to FIGS. 1-10. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A terminal device, comprising:
   at least one processor; and
   at least one memory including computer program codes;
   the at least one memory and the computer program codes are configured to, with the at least one processor, cause the terminal device to:
   transmit, a subscription for an analytics with an analytics identity to a Unified Data Management (UDM), wherein the analytics is an artificial intelligence (AI)/machine learning (ML) logic or AI/ML service or AI/ML model running in a 5G core network;
   the analytics identity is an identity of the analytics, to invoke a relevant application in the 5G core network,
   receive a subscribed analytics identity from the UDM, according to the subscription for the analytics,
   transmit a request comprising the analytics identity to a Session Management Function (SMF) or an Application Function (AF), wherein the terminal device is caused to transmit the request by:
   setting up a Protocol Data Unit (PDU) session with the SMF, transmitting the request comprising the analytics identity to the SMF with the PDU session through an Access and Mobility Management Function (AMF), or transmitting a Hyper Text Transfer Protocol (HTTP) request comprising the analytics identity to the AF, and receive analytics result data from the SMF or the AF, according to the analytics identity after authorization of the request.

2. The terminal device of claim 1, wherein the terminal device is caused to transmit the subscription with the analytics identity by:

transmitting the subscription with the analytics identity to the UDM through the AF, a Customer Relationship Management (CRM), or a portal, or the terminal device is caused to receive the subscribed analytics identity by:

receiving the subscribed analytics identity from the UDM through a UE Parameter Update (UPU) procedure.

3. The terminal device of claim 1, wherein the authorization is implemented in the UDM or in a Network Repository Function (NRF) based on a terminal device information and associated information.

4. A Unified Data Management (UDM), comprising:

at least one processor; and at least one memory including computer program codes;

the at least one memory and the computer program codes are configured to, with the at least one processor, cause the device to:

receive, a subscription for an analytics with an analytics identity from a terminal device, wherein the analytics is an artificial intelligence (AI)/machine learning (ML) logic or AI/ML service or AI/ML model running in a 5G core network;

the analytics identity is an identity of the analytics, to invoke a relevant application in the 5G core network, in response to receiving the subscription for the analytics, register a terminal device information in the UDM, along with Public Land Mobile Network (PLMN) information and slice information associated with the terminal device, wherein the terminal device information comprises at least one of: a terminal device identity, the analytics identity, at least one supported slice identity per analytics identity, or at least one supported PLMN identity per analytics identity, and transmit a subscribed analytics identity to the terminal device.

5. The UDM of claim 4, wherein the UDM is further caused to:

receive a request for a terminal device information associated with the analytics identity and the terminal device identity from a Network Repository Function (NRF), or from a Network Data Analytics Function (NWDAF), and in response to receiving the request for the terminal device information, transmit the terminal device information to the NRF, or to the NWDAF.

6. A method comprising:

transmitting, at a terminal device, a subscription for an analytics with an analytics identity to a Unified Data Management (UDM), wherein the analytics is an artificial intelligence (AI)/machine learning (ML) logic or AI/ML service or AI/ML model running in a 5G core network;

the analytics identity is an identity of the analytics, to invoke a relevant application in the 5G core network, receiving a subscribed analytics identity from the UDM, according to the subscription for the analytics, transmitting a request comprising the analytics identity to a Session Management Function (SMF) or an Application Function (AF), wherein transmitting the request further comprising:

setting up a Protocol Data Unit (PDU) session with the SMF, transmitting the request comprising the analytics identity to the SMF with the PDU session through an Access and Mobility Management Function (AMF), or transmitting a Hyper Text Transfer Protocol (HTTP) request comprising the analytics identity to the AF, and receiving analytics result data from the SMF or the AF, according to the analytics identity after authorization of the request.

7. The method of claim 6, wherein transmitting the subscription with the analytics identity further comprising:

transmitting the subscription with the analytics identity to the UDM through the AF, a Customer Relationship Management (CRM), or a portal, or receiving the subscribed analytics identity from the UDM through a UE Parameter Update (UPU) procedure.

8. The method of claim 6, wherein the authorization is implemented in the UDM or in a Network Repository Function (NRF) based on a terminal device information and associated information.

* * * * *